United States Patent
Fu

(10) Patent No.: US 8,563,451 B2
(45) Date of Patent: *Oct. 22, 2013

(54) OPTICAL GLASS

(75) Inventor: Jie Fu, Kanagawa (JP)

(73) Assignee: Ohara Inc., Sagamihara-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,858

(22) Filed: Sep. 30, 2011

(65) Prior Publication Data

US 2012/0028785 A1 Feb. 2, 2012

Related U.S. Application Data

(63) Continuation of application No. 12/312,003, filed as application No. PCT/JP2007/069350 on Oct. 3, 2007.

(30) Foreign Application Priority Data

Oct. 24, 2006 (JP) ................... 2006-288246

(51) Int. Cl.
*C03C 3/155* (2006.01)
*C03C 3/15* (2006.01)

(52) U.S. Cl.
USPC .............................. 501/51; 501/50

(58) Field of Classification Search
USPC .............................. 501/49, 50, 51
See application file for complete search history.

(56) References Cited

U.S. PATENT DOCUMENTS

| | | | |
|---|---|---|---|
| 3,150,990 A * | 9/1964 | Faulstich | 501/51 |
| 6,558,316 B2 * | 5/2003 | Kikuchi et al. | 600/133 |
| 6,797,659 B2 | 9/2004 | Uehara | |
| 8,187,986 B2 * | 5/2012 | Fu | 501/51 |
| 2004/0106507 A1 | 6/2004 | Kasuga et al. | |
| 2005/0197243 A1 | 9/2005 | Hayashi | |
| 2007/0049483 A1 * | 3/2007 | Hayashi | 501/78 |
| 2007/0249480 A1 * | 10/2007 | Kobayashi et al. | 501/78 |
| 2011/0065564 A1 * | 3/2011 | Fu | 501/42 |

FOREIGN PATENT DOCUMENTS

| | | | |
|---|---|---|---|
| JP | 62-41180 | | 1/1987 |
| JP | 01-308843 | | 12/1989 |
| JP | 08-073229 | | 3/1996 |
| JP | 08-319124 | | 12/1996 |
| JP | 2000-128570 | | 5/2000 |
| JP | 2002-362938 | | 12/2002 |
| JP | 2002-362939 | | 12/2002 |
| JP | 2003-238198 | | 8/2003 |
| JP | 2004-099428 | | 4/2004 |
| JP | 2005-239506 | | 9/2005 |
| JP | 2005-247613 | | 9/2005 |
| JP | 2006089369 A | * | 4/2006 |
| JP | 2006131450 A | * | 5/2006 |

* cited by examiner

*Primary Examiner* — Karl Group
*Assistant Examiner* — Elizabeth A Bolden
(74) *Attorney, Agent, or Firm* — Hoffmann& Baron LLP

(57) ABSTRACT

The invention provides a novel optical glass which has a refractive index (nd) of 1.78 to 2.2 and an Abbe value (vd) of 16 to less than 40 and is suitable for precision mold press molding by virtue of its having a low glass transition temperature, namely, an optical glass which contains by mole in terms of oxides 25 to 60% $B_2O_3$, 2 to 45% (in total) $TiO_2$ and $Nb_2O_5$ and 1 to 25% $WO_3$ and has a refractive index (nd) of 1.78 to 2.2 and an Abbe value (vd) of 16 to less than 40. Further, the glass contains 5 to 35% $La_2O_3$ and 1 to 40% ZnO and has a glass transition temperature (Tg) of 700° C. or below. The optical glass is excellent in meltability, stability and devitrification resistance and has a high refractive index, high light-dispersive power and excellent precision press moldability.

18 Claims, No Drawings

OPTICAL GLASS

CROSS-REFERENCE TO RELATED APPLICATIONS

This application is a continuation application of U.S. application Ser. No. 12/312,003, filed on Apr. 22, 2009, which is the National Stage filing in the U.S. of International Application No. PCT/JP2007/069350, filed Oct. 3, 2007, which is based on and claims the benefit of priority from Japanese Patent Application No. 2006-288246, filed on Oct. 24, 2006, the entire contents of all of which are incorporated herein by reference.

BACKGROUND OF THE INVENTION

1. Field of the Invention

The present invention relates to an optical glass, and in particular relates to an optical glass having a high refractive index and a high dispersive power.

2. Description of the Related Art

With recent advent of digital cameras, instruments using optical systems have rapidly been integrated and functionalized, and the optical systems are increasingly required to be highly accurate, lighter and smaller. Thus, to realize this requirement, an optical design using an aspheric lens is becoming mainstream. Thus, a mold molding technique of directly forming an optical surface without requiring grinding and polishing steps has been more frequently employed in order to stably supply a large amount of the aspheric lens using a highly functional glass at low cost, and demands for optical glasses suitable for the mold molding and having high functionality (e.g., high refractive index, low dispersive power/high refractive index, high dispersive power) have increased year by year.

Precision press molding of glasses is a technique to obtain a glass molded article having a final product shape or a shape extremely close thereto and having an accurate surface, by using a molding tool having a cavity having a predetermined shape and molding a glass preform with pressure at high temperature. By employing the precision press molding, it is possible to produce a molded article having the desired shape, with high productivity. Thus, various optical glass parts such as spherical lenses, aspheric lenses and diffraction gratings are currently produced by precision press molding. In order to obtain the optical glass parts by precision press molding, it is obviously necessary to mold the glass preform with pressure at high temperature as described above. Thus, the molding tool used for the press is exposed to the high temperature and high pressure. Consequently, it is desirable to lower the glass transition temperature (Tg) of the glass preform as far as possible, from the standpoint of reducing damage of the molding tool itself and of the mold releasing film provided on an internal surface of the molding tool, due to the high temperature environment during the press molding. Glass having a high devitrification resistance is also strongly required for producing the glass preform.

Conventionally, optical glass having a high refractive index and a high dispersive power is typified by a composition containing lead oxide in a large amount, which has been used for precision mold press because the glass is highly stable and the glass transition temperature (Tg) is low. For example, the optical glass for the precision mold press, which contains lead oxide in a large amount, is disclosed in Patent Document 1.

However, the environment when the precision mold press molding is carried out is kept in a reductive atmosphere in order to prevent oxidation of a die. Thus, when lead oxide is contained as a glass component, reduced lead is precipitated from the glass surface and adheres to the die surface, thereby reducing the accuracy of the dimensions of the surface of the die. Also, lead oxide is harmful to the environment and has been desired not to be contained.

In response to such desire, various glasses containing $B_2O_3$, $La_2O_3$ and the like as essential components have been developed as optical glass for press molding, having a high refractive index and a high dispersive region and containing no lead oxide. These glasses are disclosed in, for example, Patent Documents 2, 3 and 4.

However, ZnO or alkali metal oxides such as $Li_2O$ or $Na_2O$ which are described to be useful for lowering the glass transition temperature is sparingly contained in the composition having a refractive index (nd) of 1.78 or more and an Abbe number (vd) of 16 or more, which is very useful for the optical design among the compositions of the glasses disclosed in these Patent Documents. Thus, they have high glass transition temperatures (Tg) and are less suitable for being mold pressed.

Patent Document 1: Japanese Unexamined Patent Application Publication No. Hei01-308843

Patent Document 2: Japanese Unexamined Patent Application Publication No. 2000-128570

Patent Document 3: Japanese Unexamined Patent Application Publication No. 2002-362939

Patent Document 4: Japanese Unexamined Patent Application Publication No. 2005-239506

SUMMARY OF THE INVENTION

Problems to be Solved by the Invention

It is an object of the present invention to provide a novel optical glass which has a refractive index (nd) of 1.78 to 2.2 and an Abbe number (vd) of 16 to less than 40 and is suitable for precision mold press molding by virtue of its low glass transition temperature.

Means for Solving the Problems

As a result of an extensive study for solving the above problem, the present inventor has found that an optical glass having optical constants in the above particular ranges can be obtained by including "$B_2O_3$", "$TiO_2$ and/or $Nb_2O_3$" and "$WO_3$" in predetermined ranges without including lead, and that a glass preform material suitable for precision press molding is easily obtained because the optical glass has a low glass transition temperature (Tg) which enables precision press molding, and has completed the present invention.

More specifically, the present invention provides the following.

In a first aspect of the present invention, provided is an optical glass containing 25 to 60 mol % $B_2O_3$, a total of 4 to 45 mol % $TiO_2$ and/or $Nb_2O_3$, and 1 to 25 mol % $WO_3$ in terms of their oxides and having a refractive index (nd) of 1.78 to 2.2 and an Abbe number (vd) of 16 to less than 40.

According to this aspect, the optical glass is excellent in meltability, stability and devitrification resistance, and has a high refractive index and a high dispersive power. These are because $B_2O_3$, which is indispensable as an oxide for forming the glass and is effective for enhancing the devitrification resistance and viscosity of the glass at a liquid phase temperature, is contained in a large amount and $TiO_2$, $Nb_2O_5$ and $WO_3$, which are effective for enhancing the refractive index and the dispersive power in the glass, are contained as essential components.

In a second aspect of present invention, provided is the optical glass according to the first aspect, further containing 5 to 35 mol % $La_2O_3$ and/or 1 to 40 mol % ZnO in terms of their oxides.

According to this aspect, the optical glass has further enhanced meltability, stability and devitrification resistance, has a wider refractive index and a wider dispersion ability, has a low glass transition temperature (Tg) and is more excellent in precision press moldability. This is because of the inclusion of the $La_2O_3$ component which is effective in enhancing the refractive index of the glass and imparting a wide dispersion ability, and/or the ZnO component which is effective in lowering the glass transition temperature (Tg), in addition to the glass components according to the first aspect.

In a third aspect of the optical glass according to the first or second aspect, the optical glass contains:

0 to 15 mol % $Rn_2O$, in which Rn represents one or more selected from the group consisting of Li, Na, K and Cs; and/or 0 to 20 mol % RO, in which R represents one or more selected from the group consisting of Ba, Sr, Ca and Mg; and/or 0 to 20 mol % $GeO_2$; and/or 0 to 10 mol % $P_2O_5$; and/or 0 to 20 mol % $Yb_2O_3$; and/or 0 to 10 mol % $Ta_2O_5$; and/or 0 to 10 mol % $ZrO_2$; and/or 0 to 30 mol % $TeO_2$; and/or 0 to 10 mol % $Bi_2O_3$; and/or a total of 0 to 5 mol % $Sb_2O_3$ and/or $As_2O_3$, in terms of their oxides, in which the optical glass has a refractive index (nd) of 1.78 to 2.2 and an Abbe number (vd) of 16 to less than 40, and has a glass transition temperature (Tg) of 700° C. or lower.

The optical glass is still more excellent in meltability and has a lower glass transition temperature (Tg) as a result of the inclusion of components such as $Rn_2O$, where Rn represents one or more selected from the group consisting of Li, Na, K and Cs, and RO, where R represents one or more selected from the group consisting of Ba, Sr, Ca and Mg. $Yb_2O_3$, $Ta_2O_5$, $ZrO_2$, $TeO_2$, $Ta_2O_5$, $Bi_2O_3$ and the like further enhance the refractive index and the high dispersive power of the glass. Therefore, according to this aspect, the optical glass is more excellent in meltability, devitrification resistance and chemical durability, has a further enhanced refractive index and high dispersive power and has a lower glass transition temperature.

In a fourth aspect of the present invention, provided is the optical glass according to any one of the first to third aspects, containing neither $SiO_2$ nor $Ga_2O_3$.

According to this aspect, since $SiO_2$ and $Ga_2O_3$ reduce the stability of the glass, a higher stability is obtained when they are not included.

In a fifth aspect of the optical glass according to any one of first to fourth aspects, a glass transition temperature (Tg) thereof is no higher than 700° C.

According to this aspect, since the glass transition temperature (Tg) is not higher than 700° C., precision press molding can be carried out at a relatively low temperature. Thus, damage of the molding tool used for the precision press molding, due to the high temperature environment during the press molding is reduced, and the damage of the mold releasing film provided on the internal surface in the molding tool is also reduced.

In a sixth aspect of the present invention, provided is a preform for precision press molding, the preform being composed of the optical glass according to any one of the first to fifth aspects.

In a seventh aspect of the present invention, provided is an optical element obtained by precision press molding of the preform according to the sixth aspect.

According to the sixth and seventh aspects, the optical glass according to any one of the first to fifth aspects is effective as the preform for the precision press molding due to a low glass transition temperature (Tg) which is suitable for precision press molding. Thus it becomes easy to produce the optical element by precision press molding of the preform.

Effects of the Invention

According to the present invention, it is possible to obtain an optical glass having a refractive index (nd) of 1.68 to 2.2 and an Abbe number (vd) of 16 to less than 40, further the optical glass has a glass transition temperature (Tg) of 700° C. or below, and thus is suitable for the glass preform used for the precision press molding, and for the precision press molding. The optical glass has a higher stability and smaller Abbe number (vd) than those of conventional optical glasses, i.e., the optical glass of the present invention has high dispersive power and satisfies the requirements in the recent optical design, and thus is industrially very useful.

DETAILED DESCRIPTION OF THE PREFERRED EMBODIMENTS

The present invention will be specifically described below.

Components which can be included in the optical glass of the present invention will be described. Hereinafter, a content of each component is represented by mol % unless otherwise specified.

The optical glass of the present invention contains 25 to 60% $B_2O_3$, a total of 2 to 45% $TiO_2$ and/or $Nb_2O_5$, and 1 to 25% $WO_3$ in terms of their oxides as essential components, and more preferably contains 5 to 35% $La_2O_3$ and/or 1 to 40% ZnO. More preferably, the optical glass of the present invention contains:

0 to 15% $Rn_2O$, in which Rn represents one or more selected from the group consisting of Li, Na, K and Cs; and/or 0 to 20% RO, in which R represents one or more selected from the group consisting of Ba, Sr, Ca and Mg; and/or 0 to 20% $GeO_2$; and/or 0 to 10% $P_2O_5$; and/or 0 to 20% $Yb_2O_3$; and/or 0 to 10% $Ta_2O_5$; and/or 0 to 10% $ZrO_2$; and/or 0 to 30% $TeO_2$; and/or 0 to 10% $Bi_2O_3$; and/or a total of 0 to 5% $Sb_2O_3$ and/or $As_2O_3$, as optional components, and has a refractive index (nd) of 1.78 to 2.2 and an Abbe number (vd) of 16 to less than 40, and has a glass transition temperature (Tg) of 700° C. or lower.

Glass Components

A range of each component which composes the optical glass of the present invention will be set forth below. The content of each component herein is always represented by mol % unless otherwise specified. A component of glass herein represented by % is always represented by mol % in terms of its oxide. "In terms of oxide" here refers to that each component included in the glass is represented when a summation of masses of produced oxides is 100 mol % when it is assumed that oxides, nitrate salts and the like used as raw materials of glass components are completely decomposed and transformed to oxides upon melting.

In the glass of the present invention, $B_2O_3$ component is an indispensable component as an oxide for forming the glass, and has effects of improving devitrification resistance and enhancing viscosity at liquid phase temperature of the glass. However, when the content of $B_2O_3$ component is too small, devitrification resistance is insufficient, while when the content of $B_2O_3$ component is too large, the desired refractive index is difficult to obtain. Therefore, a lower limit thereof is preferably 25%, more preferably 30% and most preferably 35%, and an upper limit thereof is preferably 60%, more preferably 55% and most preferably 50%.

The $La_2O_3$ component is an optional component which contributes to enhancement of glass stability and is effective for enhancing the refractive index and extending the dispersion ability. However, when the content of $La_2O_3$ component is too small, these effects are insufficient, while when the content of $La_2O_3$ component is too large, devitrification resistance readily and rapidly deteriorates. Therefore, in order to obtain the desired optical constants and good devitrification resistance, a lower limit thereof is preferably 5%, more preferably 8% and most preferably 9%, and an upper limit thereof is preferably 35%, more preferably 30% and most preferably 25%.

The ZnO component has a large effect on enhancing the glass stability and lowering the glass transition temperature (Tg). When the content of ZnO component is too large, it becomes difficult to obtain the desired refractive index and the devitrification resistance also easily deteriorates. Therefore, in order to lower the glass transition temperature (Tg) while maintaining good devitrification resistance, a lower limit thereof is preferably 1%, more preferably 3% and most preferably 6%, and an upper limit thereof is preferably 40%, more preferably 30% and most preferably less than 22%.

The $TiO_2$ component and/or the $Nb_2O_5$ component is effective for enhancing the refractive index of the glass, contributing to the high dispersion ability and enhancing the devitrification resistance and the chemical durability. However, when the content of $TiO_2$ component and/or the $Nb_2O_5$ component is too large, the meltability and the stability of the glass easily deteriorate. Therefore, a lower limit of their total content is preferably 2%, more preferably 3% and most preferably 5%, and the upper limit is preferably 45%, more preferably 40% and most preferably 35%. These two components can accomplish the object of the present invention even if each component alone is introduced into the glass, but it is desirable to contain $Nb_2O_5$ because this is more effective.

The $TiO_2$ component is effective for enhancing the refractive index of the glass, contributing to the high dispersion ability and lowering the liquid phase temperature. However, when the content of $TiO_2$ component is too large, devitrification of the glass tends to conversely increase. Therefore, when introduced into the glass, a lower limit thereof is preferably 2%, more preferably 3% and most preferably 4%, and an upper limit thereof is preferably 35%, more preferably 25% and most preferably 20%.

The $Nb_2O_5$ component is effective for enhancing the refractive index of the glass, contributing to the high dispersion ability and improving the devitrification resistance of the glass. When the content of $Nb_2O_5$ component is too large, the meltability of the glass tends to deteriorate. Therefore, when introduced into the glass, a lower limit thereof is preferably 2%, more preferably 3% and most preferably 5%, and its upper limit is preferably 35%, more preferably 30% and most preferably 25%.

The $WO_3$ component is an optional component which is effective in enhancing the glass stability and the refractive index, contributing to the high dispersion ability and lowering the glass transition temperature (Tg). When the content of $WO_3$ component is too large, phase splitting of the glass tends to easily increase. Therefore, a lower limit thereof is preferably 1%, more preferably 3% and most preferably 5%, and an upper limit thereof is preferably 25%, more preferably 22% and most preferably 20%.

The $Rn_2O$ (Rn represents one or more selected from the group consisting of Li, Na, K and Cs) component is an optional component having the effects of largely lowering the glass transition temperature (Tg) and facilitating melting of mixed glass raw materials. However, when the content of $Rn_2O$ component is too large, devitrification resistance readily and rapidly deteriorates. Therefore, in order to obtain a good glass transition temperature (Tg) or good devitrification resistance, the upper limit of the content thereof is preferably 15%, more preferably 12% and most preferably 8%.

The RO (R represents one or more selected from the group consisting of Ba, Sr, Ca and Mg) component is an optional component which has the effects of enhancing the meltability, the devitrification resistance and the chemical durability of the glass. However, when the content of RO component is too large, glass stability readily and rapidly deteriorates. Therefore, in order to easily obtain glass stability, the upper limit of the content thereof is preferably 20%, more preferably 15% and most preferably 10%.

The $GeO_2$ component is an optional component which is effective in enhancing the stability and the refractive index of the glass and contributes to the high dispersion ability, and preferably is introduced into the glass by replacing a portion of $B_2O_3$. However, due to its high cost, and further in order to easily obtain a Tg of 500 to 700° C., the upper limit of the content of $GeO_2$ component is preferably 20%, more preferably 15% and most preferably 10%.

The $P_2O_5$ component is an optional component which is effective in enhancing the glass stability and lowering the glass transition temperature (Tg). However, when the content of $P_2O_5$ component is too large, phase splitting of the glass tends to increase. It is, therefore, preferred that the upper limit thereof is 10%, more preferably 5%, and most preferably 3%.

The $Yb_2O_3$ component is an optional component which is effective in enhancing the refractive index of the glass and highly dispersing the light. However, when the content of $Yb_2O_3$ component is too large, the devitrification resistance of the glass deteriorates. Therefore, in order to obtain good devitrification resistance while obtaining the desired optical constants in the present invention, the upper limit thereof is preferably 20%, more preferably 10% and most preferably 5%.

The $Ta_2O_5$ component is an optional component which is effective in enhancing the refractive index and improving the chemical durability of the glass. However, when the content of $Ta_2O_5$ component is too large, phase splitting of the glass tends to increase. Therefore, in order to obtain good chemical durability while obtaining the desired optical constants in the present invention, the upper limit thereof is preferably 10%, more preferably 5% and most preferably this component is not contained.

The $ZrO_2$ component is an optional component which is effective in enhancing the refractive index and improving the chemical durability in the glass, but easily reduces the stability of the glass. Therefore, the content of $ZrO_2$ component is preferably at most 10%, more preferably 5% or less and most preferably this component is not contained.

The $TeO_2$ component is an optional component which is effective for largely extending a vitrification range, further lowering the glass transition temperature and enhancing the refractive index. However, when the content of $TeO_2$ component is too large, a thermal expansion coefficient tends to increase. When the glass materials are melted in a platinum crucible or a melting bath where a portion in contact with a melted glass is formed of platinum, tellurium and platinum easily form an alloy, and if the alloy is formed, the heat resistance of this portion reduces and may cause a hole in this portion from which the melted glass can flow out. Therefore, the upper limit thereof is preferably 30%, more preferably 20% and most preferably 15%.

The $Bi_2O_3$ component is an optional component which is effective in enhancing the stability, the refractive index and the dispersion ability of the glass and lowering the glass transition temperature (Tg). However, when the content of $Bi_2O_3$ component is too large, glass stability is impaired. Therefore, the upper limit thereof is preferably 10%, more preferably 8% and most preferably 5%.

The $Sb_2O_3$ and/or $As_2O_3$ component can be optionally added for defoaming in melting of the glass, but an content of $Sb_2O_3$ and/or $As_2O_3$ component up to 5% is sufficient. In particular, the $As_2O_3$ component is preferably not contained because it is necessary to undertake environmental protection measures for this component when the glass is produced, processed and discarded.

It is preferred that the $SiO_2$, $Ga_2O_3$, $Gd_2O_3$ and $Y_2O_3$ components are not contained.

The $SiO_2$ component is effective in enhancing the chemical durability and the viscosity, but even when added in a small amount, the stability of the glass is reduced and the glass transition temperature (Tg) easily increases. Thus, when added, an upper limit of the content of $SiO_2$ component is preferably 4%, more preferably 2% and most preferably this component is not substantially contained. Not substantially contained indicates that the component is not intentionally added but can be included as an impurity.

The $Ga_2O_3$ component is effective for enhancing the refractive index, but easily impairs the stability of the glass remarkably, and thus, it is preferred that this component is not substantially contained.

The $Gd_2O_3$ and $Y_2O_3$ components are effective in enhancing the refractive index and controlling the dispersion ability of the glass. However, they easily reduce the stability of the glass and easily increase the glass transition temperature (Tg). Thus, when added, upper limit of an individual content of $Gd_2O_3$ and $Y_2O_3$ components is preferably 5% or less, more preferably 3% and most preferably they are not substantially contained.

Components Which Are Not to be Contained

Subsequently, the components which are not to be contained in the optical glass of the present invention will be described.

Lead compounds have problems in that they easily fusion-bond with a die upon precision press molding, and require measures for environmental protection not only in the production of glass but also over the entire production process, from performing cold work, such as polishing of the glass, to disposal of the glass. It is preferred that a lead compound is not contained in the optical glass of the present invention because this compound has a large environmental load as just described.

Both cadmium and thorium harmfully affect the environment and have very large environmental loads. Thus, they should not be contained in the optical glass of the present invention.

Furthermore, it is preferred that a coloring component such as V, Cr, Mn, Fe, Co, Ni, Cu, Mo, Eu, Nd, Sm, Tb, Dy or Er is not contained in the optical glass of the present invention. Here, not contained referred to here indicates that the component is not intentionally added but can be included as an impurity.

Physical Properties

Subsequently, physical properties of the optical glass of the present invention will be described.

The optical glass of the present invention is used for purposes which require optical constants in the above ranges, and further also used as the glass preform material for obtaining a glass molded article by the precision press molding with heating and softening. Therefore, in order to reduce the damage and the deterioration of the die used at that time, to maintain a molding surface with high accuracy in the die for a long period of time and enable the precision press molding at low temperature, it has been desired to have a glass transition temperature (Tg) as low as possible. The desired glass transition temperature (Tg) is realized by using a composition in the above particular range.

It is preferred that the glass transition temperature (Tg) of the optical glass of the present invention is not higher than 700° C. The upper limit thereof is preferably 700° C., more preferably 660° C. and most preferably 640° C., and the lower limit thereof is preferably 480° C., more preferably 510° C. and most preferably 540° C. If Tg is too low, the chemical durability deteriorates and simultaneously the devitrification resistance is easily reduced, and as a result, optical glass having consistent quality readily becomes difficult to produce. Also if Tg is too high, not only does a mold press property readily deteriorated but also the meltability reduces and an unmelted portion easily occurs. Further, if the melting temperature is made high to avoid forming the unmelted portion, the amount of platinum melted from a melting vessel increases and optical transparency tends to easily deteriorate.

In the mold press molding (precision press molding), the physical properties of the optical glass of the present invention is correlated with a glass yield point (Ts) in addition to the upper limit temperature of the mold press and the glass transition temperature. The lower the temperature of the glass yield point (Ts), the greater the prevention of surface oxidation of the die. Thus, this is preferable in terms of lifespan of the die. The glass yield point (Ts) is preferably 720° C. or below, more preferably 690° C. or below and most preferably 670° C. or below. Here, the "glass yield point (Ts)" is the temperature at which elongation of the glass stops and subsequently shrinkage begins when the temperature of the glass is raised, and was measured using a thermodilatometer set to increase the temperature at a rate of 8° C./minute in the present invention.

As described above, the optical glass of the present invention can be used as the glass preform material for the press molding, or can also be pressed directly in a molten state. When the optical glass is used as the glass preform material, the method for producing the glass preform and the method for hot-forming the material are not particularly limited, and publicly known methods for producing and forming can be used. The glass preform can be produced directly from the melted glass, e.g., in the method for molding glass gobs described in Japanese Unexamined Patent Application Publication No. Hei8-319124 and the method for producing optical glasses and apparatus for production described in Japanese Unexamined Patent Application Publication No. Hei8-73229, or alternatively the glass preform may be produced by the cold work of a strip material.

The method for hot-forming the glass preform material is not particularly limited, and for example, a method such as the method for molding optical elements described in Japanese Examined Patent Application Publication No. Sho62-

41180 can be used. Also, the optical element may be produced by pressing the glass preform produced from the optical glass of the present invention, or alternatively the optical element may be produced by direct press, i.e., the melted and softened optical glass is directly pressed without making the glass preform. The optical element can includes various types of lenses such as double convex lenses, double concave lenses, plano-convex lenses, plano-concave lenses and meniscus, mirrors, prisms, and diffraction gratings.

Method for Production

The method for producing the optical glass of the present invention is not particularly limited, and may be the usual method for producing an optical glass. For example, the optical glass can be produced by the following method.

Each starting material (oxide, carbonate salt, nitrate salt, phosphate salt, sulfate salt, fluoride salt and the like) are weighed in predetermined amounts, and mixed uniformly. The mixed materials are placed in a quartz crucible or an alumina crucible, roughly melted, subsequently transferred into a gold crucible, a platinum crucible, a platinum alloy crucible or an iridium crucible, and melted in a melting furnace at 850 to 1250° C. for 1 to 10 hours. Subsequently, the melted mixture is stirred, homogenized, then cooled to an appropriate temperature and cast in the die to produce a glass.

Subsequently the produced platy glass is cut into a predetermined size, and a processed piece of an approximate cube is formed. This cube is placed in a polishing apparatus, and polished to produce a polished ball. Specifically, the glass is cut into an approximate cube, and a barrel finishing is given thereto to remove sharp edges of the approximate cube. Subsequently, the glass is placed in an Oscar processor, and the optical glass is produced by giving a rough rounding process, a finish rounding process and the polishing thereto.

The optical glass of the present invention is typically used for the purpose of a lens, a prism or a mirror. A so-called spherical glass preform can also be produced by dropping the melted glass from an outlet of an outflow pipe of platinum in the production of the optical element of the present invention. The optical element having a desired shape is produced from the polished ball and the glass preform by the precision press molding.

EXAMPLES

Examples of the present invention will be set forth below, but the following Examples are only by way of exemplifications and the present invention is not limited thereto.

Example 1 to 34

Refractive index (nd), Abbe number (vd), glass transition temperature (Tg) and glass yield point (Ts) as well as composition of Examples 1 to 34 of the optical glass according to the present invention are shown in Tables 1 to 4. The optical glass of the present invention was produced by using usual optical glass materials such as corresponding oxide, hydroxide, a carbonate salt, a nitrate salt and fluoride as the materials of each component, weighing them to achieve a composition ratio of each Example, mixing them to make a prepared raw material, placing the material into the platinum crucible, melting it at 1000 to 1350° C. for 3 to 5 hours depending on its meltability due to the composition, homogenizing it by clarifying and stirring it, casting it into the die and cooling the die. In Tables 1 to 4, the composition of each component is represented by mol %.

The refractive index (nd) and the Abbe number (vd) were measured based on JOGIS01-2003 of the glass obtained by maintaining the temperature at around the glass transition temperature (Tg) for 2 hours and cooling at a rate of 25° C./hour.

The glass transition temperature (Tg) and the glass yield point (Ts) were measured according to the method described in Japanese Optical Glass Industrial Standards IOGIS 08-2003 (method for measuring the thermal expansion of the optical glass) by using a thermodilatometer set to increase the temperature at a rate of 8° C./minute. A sample having a length of 50 mm and a diameter of 4 mm was used as a sample piece.

Comparative Example 1

The refractive index (nd), the Abbe number (vd), the glass transition temperature (Tg) and the glass yield point (Ts) as well as the composition of Comparative Example 1 of the optical glass were measured, and their results are shown in Table 4. The optical glass of Comparative Example 1 was produced in the same way as in Examples, by using usual optical glass materials such as corresponding oxide, hydroxide, a carbonate salt, a nitrate salt and fluoride as the materials of each component, weighing them to achieve the composition ratio of Comparative Example 1, mixing them to make a prepared raw material, placing this into the platinum crucible, melting it at 1380° C. for 2 hours, homogenizing it by clarifying and stirring it, casting it into the die and cooling the die.

The refractive index (nd), the Abbe number (vd), the glass transition temperature (Tg) and the glass yield point (Ts) were measured in the same way as in Examples.

TABLE 1

| | EXAMPLE | | | | | | | | |
|---|---|---|---|---|---|---|---|---|---|
| | 1 | 2 | 3 | 4 | 5 | 6 | 7 | 8 | 9 |
| $B_2O_3$ | 40 | 40 | 43 | 43 | 43 | 43 | 43 | 43 | 43 |
| $SiO_2$ | — | — | — | — | — | — | — | — | — |
| $GeO_2$ | — | — | — | — | — | — | — | — | — |
| $P_2O_5$ | — | — | — | — | — | — | — | — | — |
| ZnO | 22 | 12 | 24 | 24 | 24 | 28 | 24 | 24 | 24 |
| BaO | — | — | — | — | — | — | — | — | 4 |
| $Li_2O$ | — | — | 4 | — | 4 | — | — | 4 | — |
| $TiO_2$ | 10 | 10 | 10 | 7 | 15 | 10 | 10 | 7 | 7 |
| $La_2O_3$ | 15 | 20 | 15 | 15 | 10 | 15 | 15 | 15 | 18 |
| $Gd_2O_3$ | — | — | — | — | — | — | — | — | — |
| $SnO_2$ | — | — | — | — | — | — | — | — | — |
| $ZrO_2$ | — | — | — | — | — | — | — | — | — |
| $TeO_2$ | — | — | — | — | — | — | — | — | — |
| $Bi_2O_3$ | — | — | — | — | — | — | — | — | — |
| $WO_3$ | 8 | 8 | 4 | 4 | 4 | 4 | 8 | 4 | 4 |

TABLE 1-continued

|  | EXAMPLE | | | | | | | | |
|---|---|---|---|---|---|---|---|---|---|
|  | 1 | 2 | 3 | 4 | 5 | 6 | 7 | 8 | 9 |
| $Nb_2O_5$ | 5 | 10 | — | 3 | — | — | — | — | — |
| $Ta_2O_5$ | — | — | — | — | — | — | — | 3 | — |
| $Sb_2O_3$ | — | — | — | — | — | — | — | — | — |
| nd | 1.889 | 1.941 | 1.825 | 1.837 | 1.822 | 1.839 | 1.830 | 1.832 | 1.822 |
| νd | 31.4 | 29.5 | 37.3 | 36.5 | 33.6 | 35.3 | 37.0 | 37.8 | 39.3 |
| Tg (° C.) | 597 | 622 | 553 | 556 | 551 | 591 | 596 | 561 | 591 |
| Ts (° C.) | 632 | 652 | 586 | 588 | 586 | 626 | 628 | 593 | 625 |

TABLE 2

|  | EXAMPLE | | | | | | | | |
|---|---|---|---|---|---|---|---|---|---|
|  | 10 | 11 | 12 | 13 | 14 | 15 | 16 | 17 | 18 |
| $B_2O_3$ | 10 | 46 | 40 | 40 | 40 | 40 | 40 | 40 | 40 |
| $SiO_2$ | — | — | — | — | — | — | — | — | — |
| $GeO_2$ | — | — | — | — | — | — | — | — | — |
| $P_2O_5$ | — | — | — | — | — | — | — | — | — |
| ZnO | 24 | 28 | 17 | 12 | 7 | 7 | 7 | 12 | 19.5 |
| BaO | — | — | — | — | — | — | — | — | — |
| $Li_2O$ | — | — | — | — | — | — | — | — | — |
| $TiO_2$ | 10 | 7 | 10 | 10 | 10 | 15 | 10 | 15 | 10 |
| $La_2O_3$ | 15 | 15 | 15 | 15 | 15 | 15 | 15 | 15 | 15 |
| $Gd_2O_3$ | — | — | — | — | — | — | — | — | — |
| $SnO_2$ | — | — | — | — | — | — | — | — | — |
| $ZrO_2$ | — | — | — | — | — | — | — | — | — |
| $TeO_2$ | — | — | — | — | — | — | — | — | — |
| $Bi_2O_3$ | — | — | — | — | — | — | — | — | — |
| $WO_3$ | 8 | 4 | 8 | 8 | 8 | 8 | 13 | 8 | 8 |
| $Nb_2O_5$ | — | — | 10 | 15 | 20 | 15 | 15 | 10 | 7.4 |
| $Ta_2O_5$ | 3 | — | — | — | — | — | — | — | — |
| $Sb_2O_3$ | — | — | — | — | — | — | — | — | 0.1 |
| nd | 1.869 | 1.807 | 1.924 | 1.957 | 1.988 | 1.975 | 1.965 | 1.946 | 1.908 |
| νd | 33.6 | 39.7 | 28.7 | 26.4 | 24.4 | 24.9 | 25.4 | 26.8 | 29.9 |
| Tg (° C.) | 600 | 593 | 605 | 607 | 613 | 617 | 614 | 609 | 598 |
| Ts (° C.) | 633 | 626 | 637 | 638 | 648 | 650 | 648 | 643 | 629 |

TABLE 3

|  | EXAMPLE | | | | | | | | |
|---|---|---|---|---|---|---|---|---|---|
|  | 19 | 20 | 21 | 22 | 23 | 24 | 25 | 26 | 27 |
| $B_2O_3$ | 40 | 40 | 43 | 43 | 40 | 40 | 40 | 40 | 40 |
| $SiO_2$ | — | — | — | — | — | — | — | — | — |
| $GeO_2$ | — | — | — | — | — | — | — | — | — |
| $P_2O_5$ | — | — | — | — | — | — | — | — | — |
| ZnO | 15 | 25 | 24 | 24 | 7 | 15 | 17 | 25 | 15 |
| BaO | — | — | — | — | — | — | — | — | — |
| $Li_2O$ | — | — | — | — | — | — | 4 | — | — |
| $TiO_2$ | 10 | — | 7 | 7 | 10 | — | 3 | 3 | 7 |
| $La_2O_3$ | 18.5 | 15 | 15 | 15 | 15 | 18.5 | 15 | 15 | 18.5 |
| $Gd_2O_3$ | — | — | — | — | — | — | — | — | — |
| $SnO_2$ | — | — | — | — | — | — | — | — | — |
| $ZrO_2$ | — | — | — | — | — | — | — | — | — |
| $TeO_2$ | — | — | 3 | — | 6 | 10 | 17 | 3 | 3 |
| $Bi_2O_3$ | — | — | — | 3 | — | — | — | — | — |
| $WO_3$ | 8 | 10 | 8 | 8 | 2 | 8 | 8 | 4 | 8 |
| $Nb_2O_5$ | 8.4 | 10 | — | — | 20 | 8.5 | — | 10 | 8.5 |
| $Ta_2O_5$ | — | — | — | — | — | — | — | — | — |
| $Sb_2O_3$ | 0.1 | — | — | — | — | — | — | — | — |
| nd | 1.926 | 1.887 | 1.829 | 1.864 | 1.983 | 1.896 | 1.841 | 1.894 | 1.917 |
| νd | 30.0 | 31.4 | 36.4 | 32.8 | 24.8 | 32.2 | 34.6 | 31.8 | 30.6 |
| Tg (° C.) | 611 | 590 | 590 | 574 | 597 | 586 | 562 | 590 | 606 |
| Ts (° C.) | 643 | 620 | 621 | 606 | 609 | 619 | 696 | 622 | 639 |

TABLE 4

| | EXAMPLE | | | | | | | COMPARATIVE EXAMPLE |
|---|---|---|---|---|---|---|---|---|
| | 28 | 29 | 30 | 31 | 32 | 33 | 34 | 1 |
| $B_2O_3$ | 40 | 40 | 40 | 40.5 | 40 | 40 | 40 | 30.8 |
| $SiO_2$ | — | — | — | — | — | — | — | 19.6 |
| $GeO_2$ | — | — | — | — | — | — | — | — |
| $P_2O_5$ | — | — | — | — | — | — | — | — |
| ZnO | 20 | 22 | 20 | 12 | 15 | 14 | 14.5 | 0.6 |
| BaO | — | — | — | — | — | — | — | — |
| $Li_2O$ | — | — | — | 5 | 2.5 | 3.5 | — | — |
| $TiO_2$ | — | 4 | 5 | — | — | — | 2 | — |
| $La_2O_3$ | 20 | 18 | 15 | 16.5 | 17.5 | 16.5 | 20 | 23.6 |
| $Gd_2O_3$ | — | — | — | — | — | — | — | 7.8 |
| $SnO_2$ | — | — | — | — | — | — | — | — |
| $ZrO_2$ | — | — | — | — | — | — | 2 | 8.8 |
| $TeO_2$ | — | — | — | — | — | — | — | — |
| $Bi_2O_3$ | — | — | — | — | — | — | — | — |
| $WO_3$ | 10 | 6 | 10 | 15 | 15 | 15.5 | 14.5 | 2.0 |
| $Nb_2O_5$ | 10 | 10 | 10 | 11 | 10 | 10.5 | 7 | 3.3 |
| $Ta_2O_5$ | — | — | — | — | — | — | — | 3.4 |
| $Sb_2O_3$ | — | — | — | — | — | — | — | 0.1 |
| nd | 1.907 | 1.908 | 1.909 | 1.900 | 1.904 | 1.902 | 1.904 | 1.889 |
| vd | 32.8 | 31.9 | 30.1 | 31.0 | 31.5 | 31.1 | 32.6 | 39.6 |
| Tg (° C.) | 608 | 602 | 602 | 568 | 579 | 570 | 610 | 730 |
| Ts (° C.) | 639 | 635 | 634 | 594 | 609 | 607 | 641 | 757 |

As can be seen in Tables 1 to 4, it has been confirmed that all of the optical glasses (No. 1 to No. 34) of Examples of the present invention have optical constants in the above ranges, i.e., a refractive index (nd) of 1.78 to 2.2 and an Abbe number (vd) of 16 or more and less than 40, a glass transition temperature (Tg) of 700° C. or below and a glass yield point of 700° C. or below, and are suitable for the glass preform used for the precision press molding and the precision press molding.

I claim:

1. An optical glass, comprising 25 to 60 mol % $B_2O_3$, 10 to 35 mol % of $La_2O_3$, a total of 2 to 45 mol % $TiO_2$ and/or $Nb_2O_5$, 2 to 25 mol % $WO_3$, and 1 to 40 mol % ZnO, a total of 20 mol % or less of RO, a total of 2.5 mol % or less of $Rn_2O$, and comprising no $GeO_2$, $Gd_2O_3$ or $Ga_2O_3$, in terms of their oxides and having a refractive index (nd) of 1.78 to 2.2 and an Abbe number (vd) of 16 to less than 40, and where R is one or more selected from the group consisting of Ba, Sr, Ca, and Mg, and Rn is one or more selected from the group consisting of Li, Na, K and Cs.

2. The optical glass according to claim 1, further comprising:
   0 to 10 mol % $P_2O_5$; and/or
   0 to 20 mol % $Yb_2O_3$; and/or
   0 to 10 mol % $Ta_2O_5$; and/or
   0 to 10 mol % $ZrO_2$; and/or
   0 to 30 mol % $TeO_2$; and/or
   0 to 10 mol % $Bi_2O_3$; and/or
   a total of 0 to 5 mol % $Sb_2O_3$ and/or $As_2O_3$,
in terms of their oxides.

3. The optical glass according to claim 1, having a glass transition temperature (Tg) of no higher than 700° C.

4. The optical glass according to claim 1, comprising 2 to 35 mol % $TiO_2$ and/or 2 to 25 mol % $Nb_2O_5$ in terms of their oxides.

5. The optical glass according to claim 1, further comprising 1 to less than 22 mol % ZnO in terms of their oxides.

6. The optical glass according to claim 1, comprising not less than 35 mol % $B_2O_3$ in terms of their oxides.

7. A preform for precision press molding, the preform being composed of the optical glass according to claim 1.

8. An optical element obtained by precision press molding of the preform according to claim 7.

9. The optical glass according to claim 1, comprising 10 to 25 mol % $Nb_2O_5$ in terms of their oxides.

10. The optical glass according to claim 9, further comprising 1 to less than 22 mol % ZnO in terms of their oxides.

11. The optical glass according to claim 10, further comprising:
   0 to 10 mol % $P_2O_5$; and/or
   0 to 20 mol % $Yb_2O_3$; and/or
   0 to 10 mol % $Ta_2O_5$; and/or
   0 to 10 mol % $ZrO_2$; and/or
   0 to 30 mol % $TeO_2$; and/or
   0 to 10 mol % $Bi_2O_3$; and/or
   a total of 0 to 5 mol % $Sb_2O_3$ and/or $As_2O_3$,
in terms of their oxides.

12. A preform for precision press molding, the preform being composed of the optical glass according to claim 10.

13. An optical element obtained by precision press molding of the preform according to claim 12.

14. The optical glass according to claim 9, comprising not less than 35 mol % $B_2O_3$ in terms of their oxides.

15. The optical glass according to claim 14, further comprising:
   0 to 10 mol % $P_2O_5$; and/or
   0 to 20 mol % $Yb_2O_3$; and/or
   0 to 10 mol % $Ta_2O_5$; and/or
   0 to 10 mol % $ZrO_2$; and/or
   0 to 30 mol % $TeO_2$; and/or
   0 to 10 mol % $Bi_2O_3$; and/or
   a total of 0 to 5 mol % $Sb_2O_3$ and/or $As_2O_3$,
in terms of their oxides.

16. A preform for precision press molding, the preform being composed of the optical glass according to claim 14.

17. An optical element obtained by precision press molding of the preform according to claim 16.

18. The optical glass according to claim 9, further comprising:
0 to 10 mol % $P_2O_5$; and/or
0 to 20 mol % $Yb_2O_3$; and/or
0 to 10 mol % $Ta_2O_5$; and/or 0 to 10 mol % $ZrO_2$; and/or
0 to 30 mol % $TeO_2$; and/or
0 to 10 mol % $Bi_2O_3$; and/or
a total of 0 to 5 mol % $Sb_2O_3$ and/or $As_2O_3$,
in terms of their oxides.

* * * * *